United States Patent [19]

Spiller et al.

[11] 4,291,309

[45] Sep. 22, 1981

[54] FM/CW RADAR

[75] Inventors: Basil H. R. Spiller, Byfleet; Allan F. Pratt, Sutton, both of England

[73] Assignee: Decca Limited, London, England

[21] Appl. No.: 69,076

[22] Filed: Aug. 23, 1979

[30] Foreign Application Priority Data

Aug. 25, 1978 [GB] United Kingdom ............... 34621/78

[51] Int. Cl.³ .............................................. G01S 13/32
[52] U.S. Cl. ..................... 343/7.5; 343/7.6; 343/14
[58] Field of Search ............................ 343/7.5, 7.6, 14

[56] References Cited

U.S. PATENT DOCUMENTS

| | | | |
|---|---|---|---|
| 2,542,182 | 2/1951 | Crump | 343/14 X |
| 2,724,828 | 11/1955 | Dunn | 343/14 |
| 3,289,204 | 11/1966 | Murray et al. | 343/7.5 |
| 3,550,124 | 12/1970 | Heft et al. | 343/7.5 |

FOREIGN PATENT DOCUMENTS 1310025 3/1973 United Kingdom .

OTHER PUBLICATIONS

*Miniature Radar Systems Using Gunn Effect Oscillators,* N. V. Philips, 11 pp.

Primary Examiner—T. H. Tubbesing
Attorney, Agent, or Firm—Cushman, Darby & Cushman

[57] ABSTRACT

In a frequency modulated carrier wave radar the detection of the beat frequency that represents range is interrupted for short intervals that occur near maxima or minima of the modulating signal that controls the frequency of the transmitted carrier wave. During these intervals of interruption the carrier wave is modulated in amplitude so that it can convey information to the target that it illuminates. In a preferred embodiment, the amplitude modulation consists of a variable number of cycles of a voltage controlled oscillator of which the frequency is controlled by an integrated signal which represents the beat frequency. Timing for the short intervals of amplitude modulation and somewhat longer intervals that extend before and after each interval of amplitude modulation is derived from a square wave signal that is produced by an oscillator that governs the frequency of the carrier wave.

7 Claims, 4 Drawing Figures

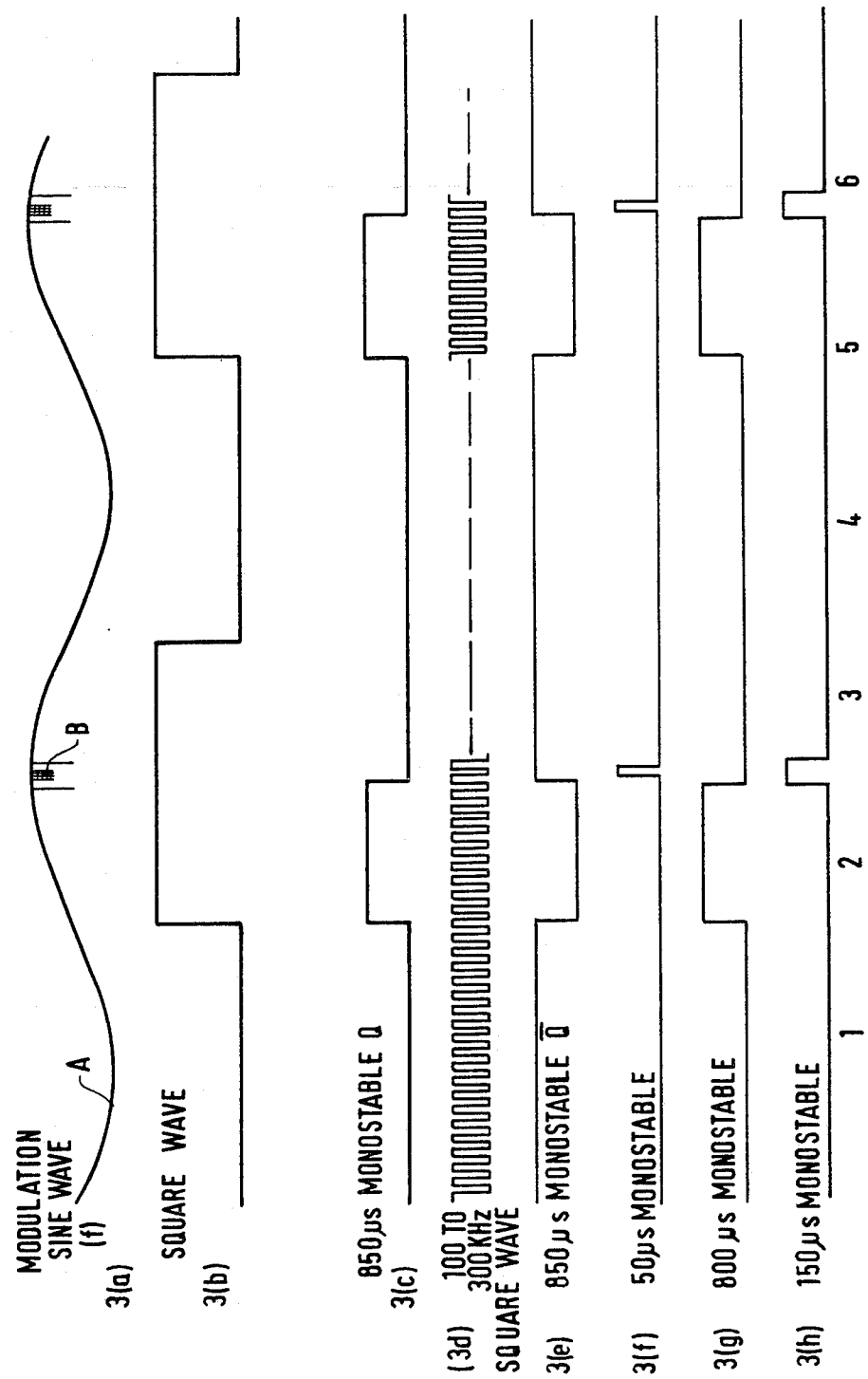

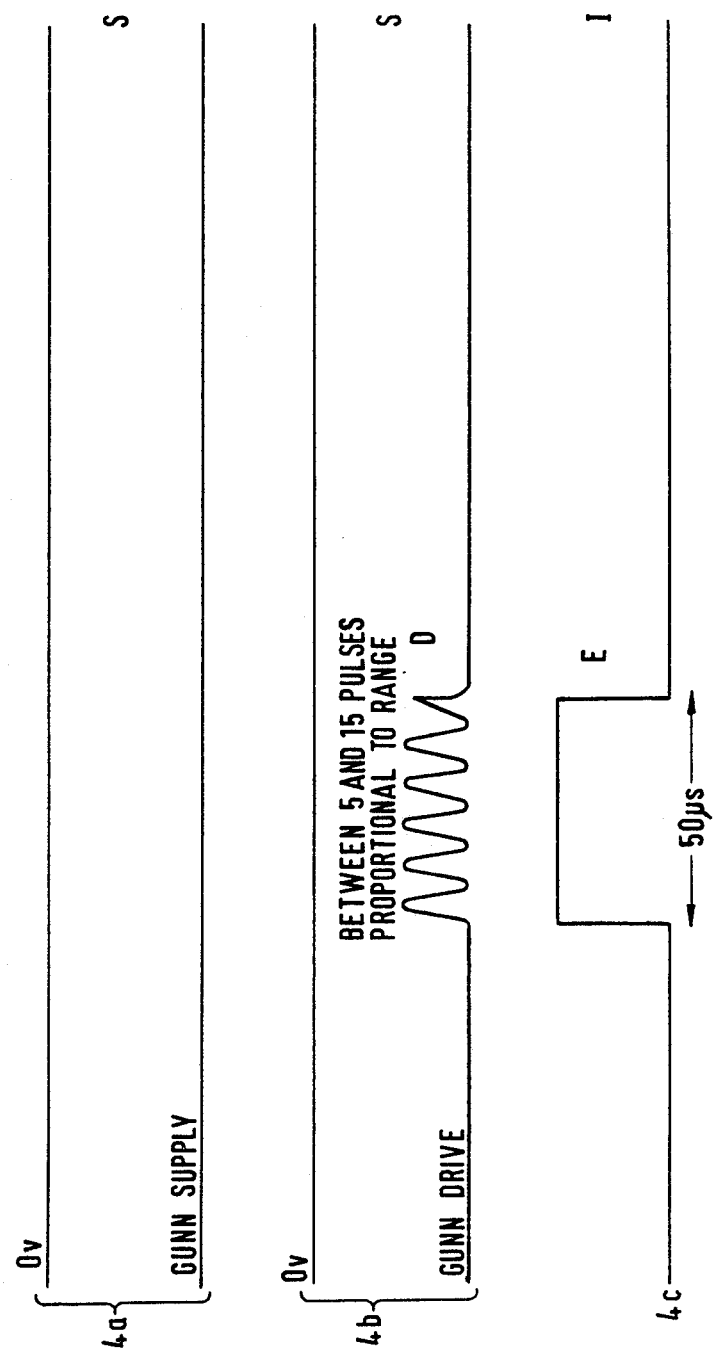

FM/CW RADAR

BACKGROUND OF THE INVENTION

This invention relates to FM/CW radar, i.e., a radar in which a signal in the form of a periodically frequency modulated carrier is radiated and is, directly or indirectly, compared with an echo signal to obtain a signal representing a beat frequency between the radiated and echo signals. The beat frequency is proportional to the range of the target.

Whether sinusoidal or some other form of periodic modulation of the radiated frequency is used, the beat frequency at times associated with maxima or minima of the transmitted frequency is low either because the rate of change of the transmitted frequency is low at the times of such maxima or minima or because at times near such maxima the difference between the instantaneous frequencies of the radiated signal and the echo signal passes through zero. In consequence, the beat frequency at such times is abnormal; there is in effect a loss of the beat frequency signal during short intervals at times near the peaks of the modulating waveform. The loss of information is not serious, because the duration of the intervals during which an adequate beat frequency is normally produced is usually comparatively so long that an average of the beat frequency signal indicates range sufficiently accurately.

SUMMARY OF THE INVENTION

Part of the present invention is based on the use of only a portion of the cycle of modulation of the carrier frequency for the detection of the beat frequency; the remaining portion, including preferably at least some of the aforementioned intervals when the beat frequency is attenuated or unrepresentative of the mean beat frequency, is available for the transmission of information. This information may be conveyed by a secondary modulation, preferably an amplitude modulation, of the transmitted carrier signal, preferably for short periods occurring substantially simultaneously with maxima or minima of the carrier frequency, or the signal that controls it, these periods being short enough so that the detection of the beat frequency for the determination of range may be temporarily inhibited without significant effect on the average beat frequency.

The secondary modulation may represent any suitable information but, in a preferred embodiment of the invention, constitutes an analogue of the range which is represented by and derived from the beat frequency that is detected in the intervals during which the secondary modulation is absent or suppressed. As is indicated hereinafter, this feature of the invention enables the range of a target to be conveniently transmitted by the radar beam that illuminates that target.

DESCRIPTION OF THE DRAWINGS

FIGS. 3 and 4 are diagrams of waveforms that occur in various parts of the encoder illustrated in FIG. 1.

DESCRIPTION OF THE PREFERRED EMBODIMENTS

Figure 1:
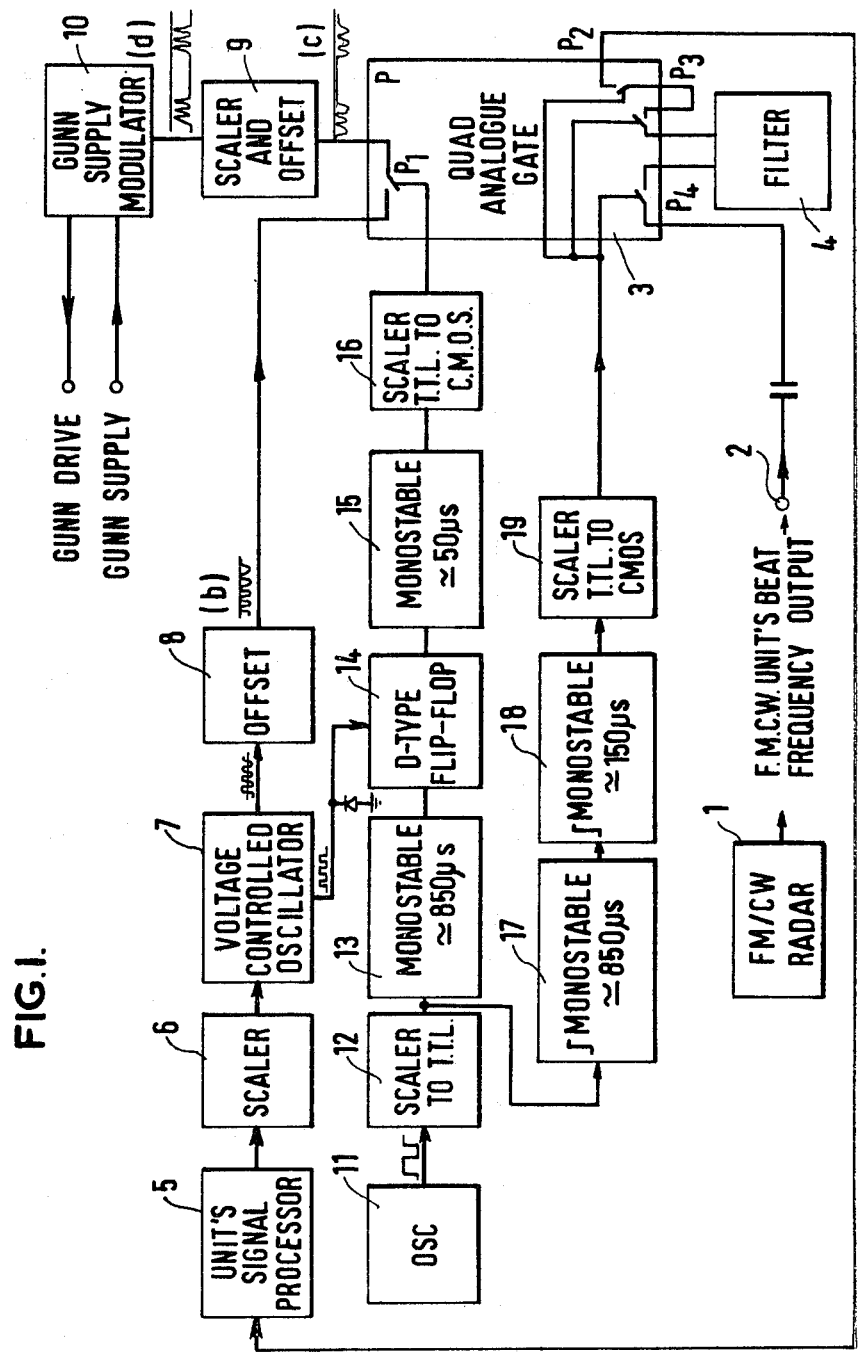
FIG. 1 is a schematic diagram of an encoder which constitutes part of an FM/CW radar.

The particular embodiment that will be described is part of a frequency modulated carrier wave radar that is otherwise of commonplace construction. The main part, denoted by the reference 1 in FIG. 1, of the radar includes a Gunn oscillator that produces a frequency modulated carrier wave which is radiated by an antenna and includes a receiver which mixes the echo signal, if any, with the instant transmitted frequency (directly or indirectly) so as to produce in known manner a beat frequency that is proportional to the range of the target. In this embodiment the modulating signal that controls the frequency of the carrier wave is denoted by the waveform 3(a) of FIG. 3. It is convenient to mention now that although the supply and drive voltages to the Gunn oscillator are normally constant, the supply voltage is, during short intervals occurring in time near the positive peaks of the principal modulating signal A, modulated so as to produce for each occurrence a period, in this embodiment of the order of 50 microseconds, of amplitude modulation of the carrier wave. The timing of the periods B of amplitude modulation relative to the principal modulating signal A is shown on waveform 3(a). Each period of secondary modulation is embraced by a somewhat longer interval (C) during which the receiver is "blanked" as hereinafter described.

The beat frequency output from the main part 1 of the radar is received at a terminal 2 and thence proceeds to a quad analogue gate 3. Analogue gate 3 comprises, among other things, three ganged switches $P_2$–$P_4$ which are disposed in series and are controlled to disconnect the beat frequency output for intervals of 150 microseconds, timed as hereinafter described, but otherwise to couple the beat frequency output through a filter 4 to a signal processor 5. The amplitude modulation which is present in the transmitted signal appears eventually in the echo signal and in the beat frequency output. It must normally be removed before any signal processing; the filter 4 is a fourth order low-pass Butterworth filter of which the cut-off frequency is 30 KHz. It removes the high frequency amplitude modulation from the beat signal.

The processor 5, which would normally form part of the radar 1 but has been illustrated separately for convenience, essentially comprises a discriminator which converts the beat frequency into a voltage which varies in proportion to the beat frequency and which represents the range of the target. This voltage is proportionately scaled by a scaler 6 in order to provide a control signal that varies the frequency of a voltage controlled oscillator 7 between 100 and 300 KHz, the particular frequency representing the range of the target. The voltage controlled oscillator provides the signal which eventually modulates the amplitude of the transmitted carrier wave. One output of the oscillator 7 is offset by a circuit 8 which adds a steady voltage to the respective output of the oscillator; the resultant output from the offset circuit comprises a sinusoid of which the maxima are at zero volts. This signal is fed through a switch ($P_1$) in the quad analogue gate 3 to a scaler and offset circuit 9. This switch is closed for the intervals B of 50 microseconds so that the scaler and offset circuit 9 is fed by 50-microsecond bursts of the offset output of the voltage controlled oscillator 7. The circuit 9 converts the bursts of cycles that pass the switch to a form that is compatible with a modulator 10 for the supply of voltage to the Gunn oscillator. As is shown in FIG. 4, the supply voltage to waveform 4(a) for the Gunn oscillator is a steady negative voltage. The drive voltage of waveform 4(b) is normally a steady voltage but for each 50-microsecond period of amplitude modulation, comprises a variable number of pulses of standard height relative to the prevailing negative voltage.

It will be obvious that the circuits 9 and 10 are required only to fulfil the particular requirements of the Gunn oscillator; different circuits would be required if the form of the principal oscillator were different.

The timing of the operations of the encoder is governed by a square wave oscillator 11 which would normally form part of the radar unit 1. This oscillator produces a square wave, illustrated by waveform 3(b) of FIG. 3, which in the unit 1 is converted by means of a low-pass filter network into the sinusoidal control signal A that varies the frequency of the carrier wave when applied to a varactor diode. In the encoder, the same square wave signal is the source of timing of the bursts of amplitude modulation and the blanking intervals that embrace them. The square wave output of the oscillator 11 is scaled in this embodiment so as to be compatible with the transistor logic used in the succeeding circuits by means of a scaler 12. The leading edges of the square wave trigger a monostable multivibrator 13 of which the quasistable period endures for approximately 850 $\mu$s (waveforms 3c and 3e of FIG. 3). This period's end marks approximately the beginning of the burst of amplitude modulation. The inverse output (waveform 3e of FIG. 3) of the multivibrator 13 is fed to a D-type bistable 14; this bistable is clocked by a square wave form (waveform 3d of FIG. 3) from the voltage controlled oscillator; there is no output from the bistable circuit 14 until both the input and the clock are of logical unity; this expedient ensures that the bursts of amplitude modulation gated via switch P$_1$ always commence at the same phase of the output of the voltage controlled oscillator.

The output of the bistable circuit 14 triggers the monostable multivibrator 15 of which the quasistable state ensures for 50 microseconds; the output of this circuit is shown by waveform 3(b) of FIG. 3. This output is fed through a scaler 16, which is required in this embodiment only to convert the voltages appropriate for the transistor logic of the previous stages into voltages suitable for the CMOS logic of the quad analogue gate. In effect the output pulses 3(f) of the monostable multivibrator 15 operate the switch P$_1$ so as to permit the switch to pass 50-microsecond bursts of the secondary modulating signal; there are normally between five and fifteen cycles of modulating signal in each burst.

The output of the oscillator 11, duly scaled by the scaler 12, triggers also the monostable multivibrator 17, of which the timing period is approximately 800 microseconds (waveform 3(g) of FIG. 3). The end of this period is chosen to be 50 microseconds before the start of a respective pulse 3(f), in order to mark the commencement of a blanking period of 150 microseconds extending equally before and after the respective burst of amplitude modulation. The blanking period is timed by a monostable multivibrator 18, having the requisite timing period, which provides the pulses of that duration (waveform 3(h) of FIG. 3) through a scaler 19 to the control inputs of the three ganged gates P$_2$, P$_3$ and P$_4$ that have already been mentioned. The gates are open for the duration of the 150 microsecond pulses 3(h) but are otherwise closed to allow the beat frequency output received at the terminal 2 to pass to the processor 5.

Except for the encoder which has been described the FM/CW radar is, or may be, of commonplace form. It incorporates a detector which, because the periods of interruption of the beat frequency are comparatively short relative to the cycle of modulation of the carrier frequency, can produce, by using an ordinary integrator in the signal processor, an output which reliably indicates range. During the intervals of interruption of the detection of the beat frequency, the transmitted carrier wave conveys amplitude modulation to the target which is illuminated by the radar beam. As described in the foregoing, these intervals are preferably timed to occur when the beat frequency would be abnormal.

Such a radar has a variety of uses. One use is in a system for indicating, and preferably controlling, the distance between and closing velocity of two structures. In such a system, each of the structures may carry an FM/CW radar and transmit the range that it measures to the other so that a processor associated with each radar may correlate the range measured by the respective radar with the range that is measured by the other radar; such a system may provide greater reliability and a greater measure of accuracy than a system in which only one radar is used. Moreover, the invention might be used in a scanning FM/CW radar. If the radar beam is of sufficient width, and the rate of scanning is appropriately chosen, the radar may, within the interval during which the beam is illuminating a particular target, measure the range and bearing of that target and transmit to it an indication of the range. Such a scanning radar requires the use of various techniques to discriminate against the measurement of range of, and consequential transmission of information to, unwanted targets, but the techniques of such discrimination are generally known and require no further description.

Figure 2:
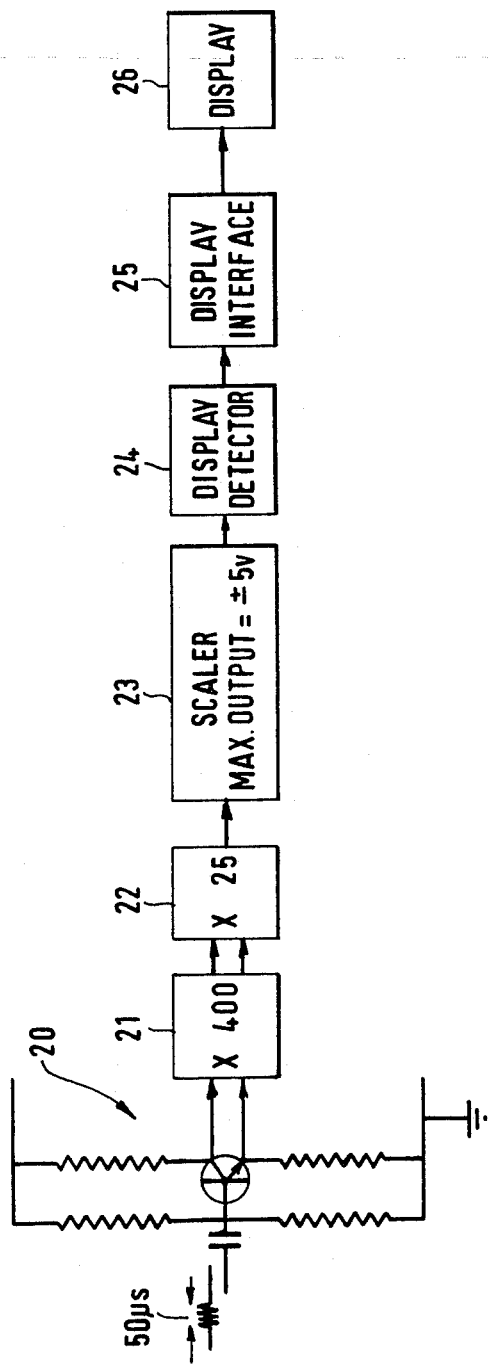
FIG. 2 is a schematic diagram of a decoder constituting a part of a remote receiver.

FIG. 2 illustrates a decoder which would form part of a remote receiver for the radiated signal. Such a receiver may be constructed following known techniques to enable the extraction of the bursts of amplitude modulation from the transmitted signal. The resultant signal is fed to the input stage 20 of a high gain amplifier. The stage 20 has a gain of unity and provides a differential output which is fed to the second stage 21, which is constituted by a high gain differential amplifier; the gain may be approximately 400. The stage 21 feeds an operational amplifier 22 which has a differential input circuit and a gain of approximately 25. The output of the stage 22 is fed to a scaler 23 which is constituted by a limiter which limits the output of the stage 22 to ±5 volts; the limiter 23 is required only to protect a following level detector 24, which produces a binary output of one value or the other according as the input is greater or smaller than some appropriate voltage within the range of the scaler. The particular level detector is chosen in this embodiment to provide an output which is compatible with the transistor logic of a display device 26, which is preceded by an interface 25. The display quantises the range denoted by the number of pulses into steps of a tenth of the maximum range and illuminates a respective one of eleven lamps according to the particular quantised value of range. It will be obvious that if it be desired, some of the form of analogue-to-digital converter may be used to convert the information that is conveyed by the radar beam into appropriate form for display or other use.

We claim:

1. In a radar in which a signal in the form of a cyclically frequency modulated carrier wave is radiated and is also compared with an echo signal to derive a beat frequency signal, the improvement comprising:
- means for interrupting detection of said beat frequency for intervals which are short relative to respective cycles of modulation of the carrier wave; and
- means for impressing secondary modulation on said carrier wave during said intervals.

2. The improvement set forth in claim 1 further comprising:
- means for timing each of said intervals to occur in the proximity of a turning point in the cycle of modulation of said carrier wave.

3. The improvement set forth in claim 2, in which said means for impressing comprises means for applying a short burst of cycles of amplitude modulation.

4. The improvement set forth in any of claims 1, 2 or 3, further comprising:
- means responsive to said beat frequency for deriving a signal representing range; and means for controlling said secondary modulation in accordance with the signal representing range.

5. In an FM/CW radar in which a signal in the form of a cyclically frequency modulated carrier wave is radiated and also compared with an echo signal to derive a beat frequency, the combination comprising:
- means for producing a cyclically varying control signal for modulating cyclically the frequency of said carrier wave, said control signal having turning points;
- means, responsive to said control signal, for producing timing signals each defining a succession of intervals, each interval being in the proximity of one of said turning points; and
- means, responsive to said timing signals, for applying amplitude modulation to said carrier wave during said intervals.

6. The combination set forth in claim 5 further comprising;
- means for detecting said beat frequency; and
- means for interrupting detection of said beat frequency for periods each of which embraces a respective one of said intervals.

7. The combination set forth in claim 6 further comprising;
- means responsive to said beat frequency for controlling said amplitude modulation.

* * * * *